United States Patent [19]
Wobber et al.

[11] Patent Number: 5,235,642
[45] Date of Patent: Aug. 10, 1993

[54] ACCESS CONTROL SUBSYSTEM AND METHOD FOR DISTRIBUTED COMPUTER SYSTEM USING LOCALLY CACHED AUTHENTICATION CREDENTIALS

[75] Inventors: Edward Wobber, Menlo Park; Martin Abadi, Palo Alto; Andrew Birrell, Los Altos, all of Calif.; Butler Lampson, Cambridge, Mass.

[73] Assignee: Digital Equipment Corporation, Maynard, Mass.

[21] Appl. No.: 917,767

[22] Filed: Jul. 21, 1992

[51] Int. Cl.[5] .................................. H04K 1/00
[52] U.S. Cl. ............................. 380/25; 380/4
[58] Field of Search ....................... 380/23, 25, 4

[56] References Cited

U.S. PATENT DOCUMENTS

| | | | |
|---|---|---|---|
| 4,677,552 | 6/1987 | Sibley | 380/23 |
| 4,847,902 | 7/1989 | Hampson | 380/25 |
| 4,941,176 | 7/1990 | Matyas et al. | 380/25 |
| 5,032,979 | 7/1991 | Hecht et al. | 380/23 |
| 5,081,678 | 1/1992 | Kaufman et al. | 380/25 |
| 5,144,659 | 9/1992 | Jones | 380/23 |

*Primary Examiner*—David Cain
*Attorney, Agent, or Firm*—Flehr, Hohbach, Test, Albritton & Herbert

[57] ABSTRACT

A distributed computer system has a number of computers coupled thereto at distinct nodes. The computer at each node of the distributed system has a trusted computing base that includes an authentication agent for authenticating requests received from principals at other nodes in the system. Requests are transmitted to servers as messages that include a first identifier provided by the requester and a second identifier provided by the authentication agent of the requester node. Each server process is provided with a local cache of authentication data that identifies requesters whose previous request messages have been authenticated. When a request is received, the server checks the request's first and second identifiers against the entries in its local cache. If there is a match, then the request is known to be authentic. Otherwise, the server node's authentication agent is called to obtain authentication credentials from the requester's node to authenticate the request message. The principal identifier of the requester and the received credentials are stored in a local cache by the server node's authentication agent. The server process also stores a record in its local cache indicating that request messages from the specified requester are known to be authentic, thereby expediting the process of authenticating received requests.

9 Claims, 5 Drawing Sheets

Auth ID Table — 142

| Auth ID | Principal |
|---|---|
| 1 | P1 as Z |
| 2 | P1 as X |
| 3 | P2 |
| 4 | P3 for X3 |
| ⋮ | ⋮ |

FIGURE 5A

Channel Assignment Table — 143

| Channel | Subchannel | Requester Process | Server Process |
|---|---|---|---|
| 1 | A | A1 | B1 |
| 1 | B | A1 | B2 |
| 1 | C | A2 | B2 |
| 2 | D | A3 | S2 |
| ⋮ | ⋮ | ⋮ | ⋮ |

| Channel, Subchannel, Auth ID | Principal ID | Timestamp (Time Limit on Validity of Credentials) | Credentials | |
|---|---|---|---|---|
| 1,A,1 | N2 for TedW | 19920515112355 | Certificate FE45131A | ← 160, 162 |
| 1,C,6 | Adabi | 19920515112531 | Certificate F12345 | |
| 3,F,2 | N3 as Emplyee | 19920515121112 | Certificate ABC12FE | |
| ⋮ | ⋮ | ⋮ | ⋮ | |

Local Cache for Auth Agent

FIGURE 7

| Channel, Subchannel, Auth ID | Principal ID | Timestamp | ACLs | |
|---|---|---|---|---|
| 1,A,1 | N2 for TedW | 19920515112355 | Obj1-ACL2, Obj23,-ACL1 | ← 164, 166 |
| 1,C,6 | Adabi | 19920515112531 | Obj1345-ACL0, Obj2,-ACL1 | |
| 3,F,2 | N3 as Emplyee | 19920515121112 | Obj45-ACL12, Obj876,-ACL0 | |
| ⋮ | ⋮ | ⋮ | ⋮ | |

Local Cache for Proc

ACCESS CONTROL SUBSYSTEM AND METHOD FOR DISTRIBUTED COMPUTER SYSTEM USING LOCALLY CACHED AUTHENTICATION CREDENTIALS

The present invention relates generally to controlling access to computer resources in a distributed computer system, and particularly to apparatus and methods for making such access control systems more efficient by locally caching in each computer authentication credentials for principals requesting use of that computer's resources.

BACKGROUND OF THE INVENTION

Computer security systems are often based on the basic access control model, which provides a foundation for secrecy and integrity security procedures. See, for example, the 1974 article by Butler Lampson, "ACM Operating System Reviews," Vol. 8, No. 1, January 1974, pp. 18-24. The elements of this model are:

Objects, which are resources such as files, devices, or processes.

Requests to perform operations on objects.

Sources for requests, which are principls.

A reference monitor that examines each request for access to a specified object and decides whether to grant it.

The reference monitor bases its decision on the object, the principal making the request, the operation in the request, and a rule that says what principals may perform that operation. It should be understood that operation of the reference monitor is separate and distinct from other security issues, such as whether a requestor is who he/she/it claims to be. That type of security is typically provided by using encryption and digital signature techniques, sometimes called authentication, as will be understood by those skilled in the art. The present invention is directed at a technique for making authentication of requesters more efficient.

In general, in most prior art systems authenticating each request by a requester requires digitally signing the request, as well as an exchange of information called "credentials" between the requester and the server to enable the server to authenticate the digital signature on the request. The authentication process can impose significant overhead on the operation of distributed computer systems, especially when the number of requests transmitted between nodes is high.

SUMMARY OF THE INVENTION

In summary, the present invention is a security system governing access to objects in a distributed computer system. The computer at each node of the distributed system has a trusted computing base that includes an authentication agent for authenticating requests received from principals at other nodes in the system. Requests are transmitted to servers as messages that include a first identifier (called an Auth ID) provided by the requester and a second identifier provided (called the subchannel value) by the authentication agent of the requester node. Each server process has an associated local cache that identifies requesters whose previous request messages have been authenticated. When a request is received, the server checks the request's first and second identifiers against the entries in its local cache. If there is a match, then the request is known to be authenic, without having to obtain authentication credentials from the requester's node, because the authentication agents guarantee authenticity of such request messages.

If the identifier in a request message does not match any of the entries in the server's local cache, then the server node's authentication agent is called to obtain authentication credentials from the requester's node to authenticate the request message. Upon receiving the required credentials from the requester node's authentication agent, the principal identifier of the requester and the received credentials are stored in a local cache by the server node's authentication agent. The server process also stores a record in its local cache indicating that request messages from the specified requester are known to be authentic, thereby expediting the process of authenticating received requests.

A further optimization is that the server process local cache is used to store a list of the object access control list entries previously satisfied by each requester, thereby enabling the server process to expedite granting access to previously accessed objects.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
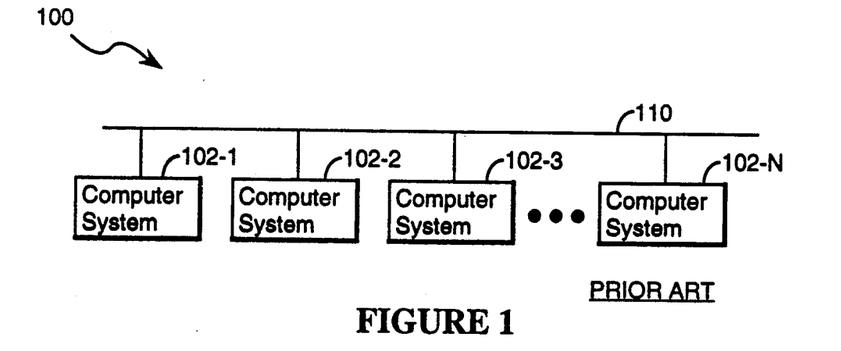
FIG. 1 is a block diagram a distributed computer system with a trusted naming service for storing secure data shared by the members of the system.

Referring to FIG. 1, the present invention is a security system and method which typically operates in the context of a distributed computer system 100 having a set of computers 102-1 to 102-N interconnected by a local or wide area network 110 or some other communications medium. Each of these computers 102 is said to be located at a distinct node of the distributed computer system 100.

For the purposes of this document, we assume that the nodes are connected to each other by wires that are not physically secure. In the preferred embodiment, shared key encryption is used to secure channels between the nodes of the distributed system, and these channels are then multiplexed to obtain all the other channels needed by the network. Since the operating system at each node must be trusted anyway, using encryption at a finer grain than this (e.g., between processes) is not necessary. Alternately, public key encryption techniques could be used to secure the channels between nodes, although public key encryption is usually much slower than shared key encryption.

Figure 2:
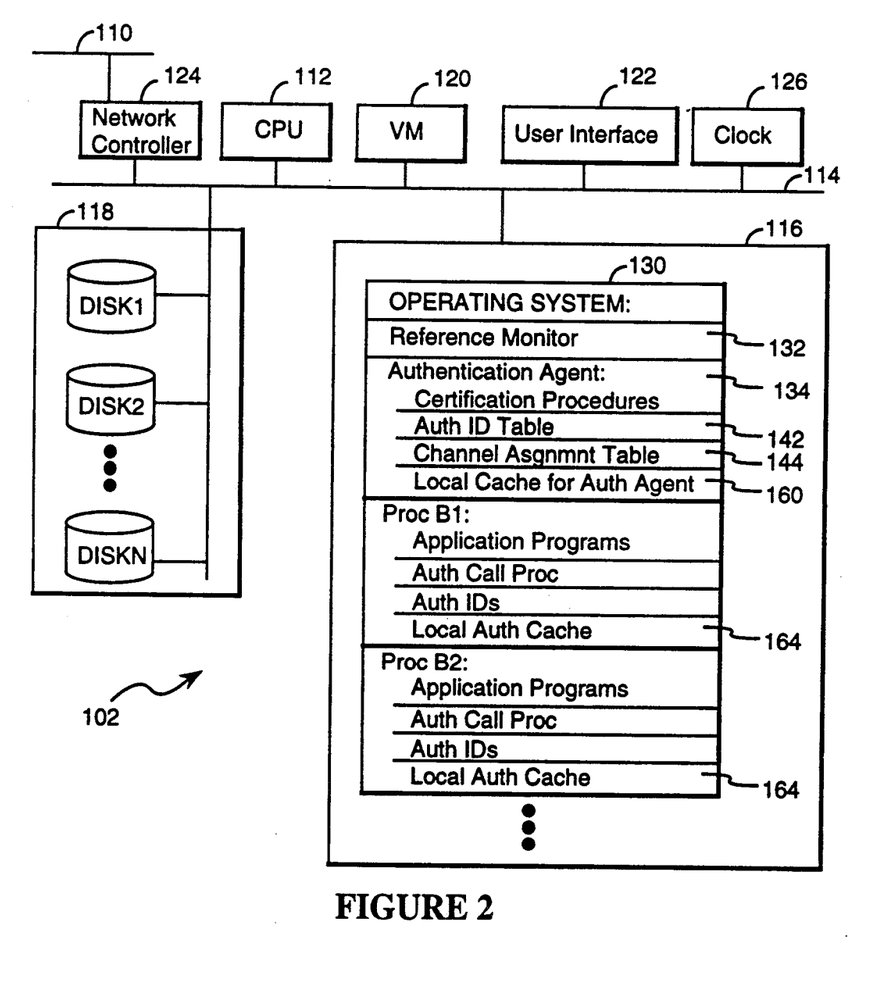
FIGS. 2 and 3 are block diagrams of one node of the distributed computer system shown in FIG. 1.

Each computer 102 contains the standard computer system components, including a data processing unit (CPU) 112, system bus 114, primary (random access) memory 116, secondary storage 118 (e.g., magnetic or optical disks), virtual memory manager 120, a user interface 122 (e.g., keyboard, monitor and printer) and network controller 124 for coupling the computer 102 to the network 110. A clock circuit 126 or equivalent mechanism provides each computer 102 with time values (used by the security apparatus discussed below). The physical computer components are not modified by the present invention and are therefore not described in detail herein.

For convenience of schematic representation, the computer's operating system 130 is shown in FIG. 2 as being stored in primary memory, but as will be understood by those skilled in the art, portions of the operating system 130 are stored by the computer's virtual memory manager 120 in secondary memory when not in use. The operating system 130 includes a reference monitor 132 and authentication agent 134, both of which are discussed in more detail below.

Also shown in FIG. 2 is the (virtual) memory allocated to two processes, B1 and B2, including application programs as well as data structures and software associated with the present invention. As will be understood by those skilled in the art, while the memory space allocated to these processes is shown for convenience as being in primary memory, much of the memory space allocated to each process will be stored by the computer's virtual memory manager 120 in secondary memory when not in use.

Figure 3:
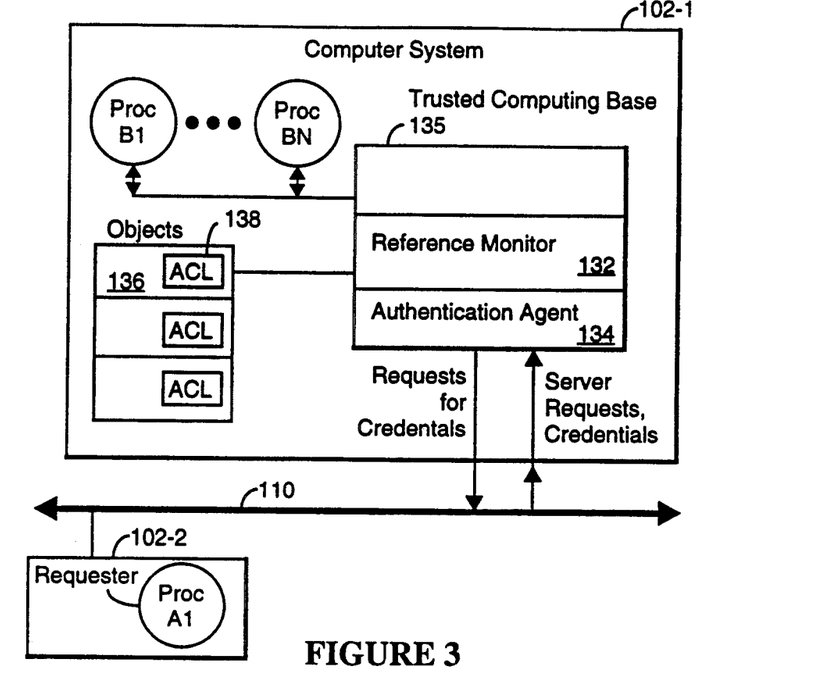

Referring to FIG. 3, one node 102-1 of the distributed system is shown in more detail. Each node must have a trusted computing base (TCB) 135, which is typically a small amount of computer hardware and software that security depends on and that is distinguished from the remainder of the node, which can misbehave without affecting security. The TCB 135 includes a reference monitor program 132 (sometimes called the reference monitor), which gathers the information needed to justify an access control decision. The reference monitor program 132 runs within the address space of each process. The TCB 135 also includes an authentication agent 134, which in the present invention is a set of software in the computer's operating system that exchanges credentials with the authentication agents of other nodes so as to authenticate the source of request messages. The authentication agent 134 also performs a number of related tasks to ensure that messages originated by processes at its node are tagged or signed with valid sender identification data, as will be described below.

The TCB 135 does not include the storage devices from which data is retrieved nor the transmission channels from which messages are received. This is because digitally signed messages can be fetched from unsecured places without any loss of confidence that the signer actually sent it originally. The details of encryption, decryption, and digital signatures and the like are not the subject of this document. These topics are widely discussed in the computer security literature. The present invention primarily concerns the authentication agent 134 and reducing the exchange of credentials associated with authenticating messages sent between requesters and servers on different nodes of the distributed computer system.

For the purposes of FIG. 3, a process A1 in node 102-2 has been labelled "requester" because it is sends a request to one of the server processes B1 to BN on node 102-1. However, it should be noted that more generally the requester can be a principal using any one of the computers in the distributed system.

A principal is herein defined to be the source of a request or assertion. Typically, one thinks of a principal as a person, or a machine acting on behalf of a person. However, processes many layers removed from human direction, such as those in a transaction processing system, can also be principals.

Objects can be files, processes, set of data such as table or database, programs (e.g., an interface program which governs use of an input/output device), and so on. In the preferred embodiment, the objects 136 to which access is governed by the reference monitor program 132 on node 102-1 are stored in the computer at that node (other arrangements may be possible). Each object 136 includes an Access Control List (ACL) 138 which defines the set of "principals" who are authorized to access the object 136.

Figure 4:
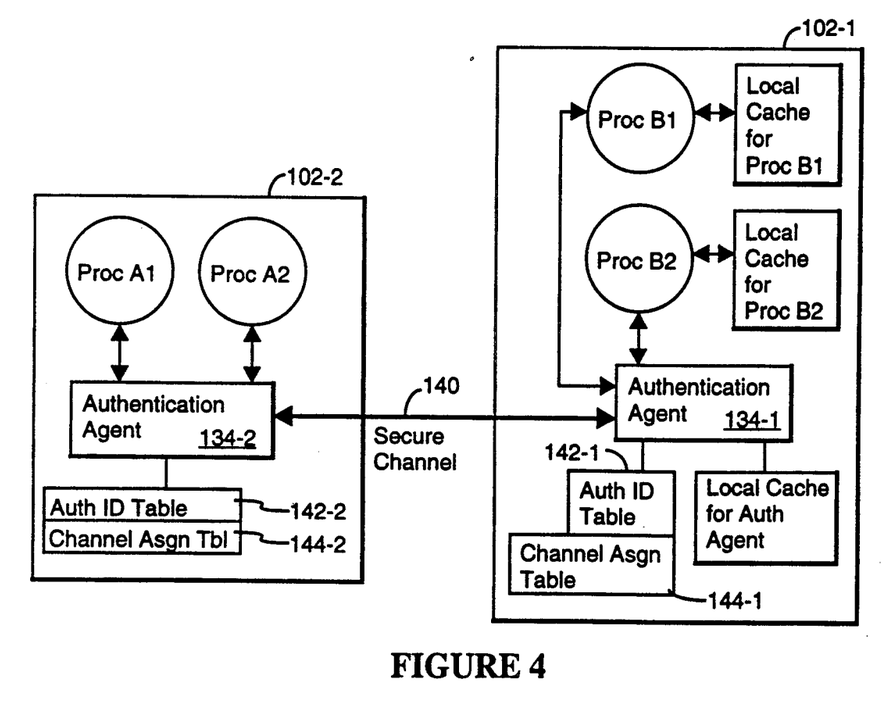
FIG. 4 is a block diagram of two computers, one having a requester process that is requesting access to a server process in the second computer.

Referring to FIG. 4, each node of the distributed system includes in its TCB an authentication agent 134. In the context of FIG. 4, we will consider the actions of the authentication agent 134 associated with process A1 on node 102-2 sending a request to a server process B1 on node 102-1.

Prior to the sending of any requests between two nodes, a secure channel 140 between the two nodes must be established. One method of establishing a secure channel between two nodes is to have the two nodes establish a host-to-host key that will be used both to encrypt and decrypt all data packets transmitted between the two nodes. Data packets in the preferred embodiment are encrypted using a private key encryption methodology, such as DES CBC.

The prior art provides any number of mechanisms for distributing encryption keys in a network. One such methodology developed at the Massachusetts Institute of Technology is known as KERBEROS. Other methodologies are known as public key systems. In any case, in the context of the present invention, any two host computers that will transmit data packets therebetween must first agree on a "host-to-host" encryption key that will used to encrypt the secure portions of data packets transmitted between those two computers. Furthermore, to ensure data integrity, a CRC error detection code is included in each data packet, usually at the end of the data packet, for detecting corrupted packets as well as for detecting packets that may have been tampered with in an attempt to break the system's security provisions. Therefore each packet received by a node's network controller 124 must be decrypted and error checked by a CRC (cyclic redundancy check) circuit before it can be used by the receiving host computer 102.

Once a secure channel 140 has been established, all data packets sent over the secure channel 140 by either node are routed through the sender's authentication agent 134. The authentication agent 134 assigns a different virtual "subchannel" of the secure channel to each requester/server process pair for which a requester process on the authentication agent's node transmit data packets to a server process on the other node. Subchannels are similar to process-to-process communication channels found in traditional operating systems. For example the Internet Transmission Control Protocol provides a bi-directional connection between two processes. However, in the present invention subchannels are implemented on top of node-to-node secure channels and authenticity guarantees can be made about the data which traverses them. Any given subchannel has two unique endpoints. The authentication agent at each endpoint guarantees the uniqueness of the endpoint it controls. Therefore, since an underlying node-to-node channel is implied, each endpoint can believe that all data received through the subchannel originated at the unique node and process associated with the other endpoint of that subchannel.

In the preferred embodiment, each principal associated with the node 102 is assigned a distinct authentication identifier, herein called the Auth ID. Typically, the assignment of the Auth ID to a principal is performed at the time that the principal logs into the system. It is possible for a single process A1 to do work on behalf of multiple principals, in which case each principal associated with the process will be given a distinct Auth ID.

Figure 5A:
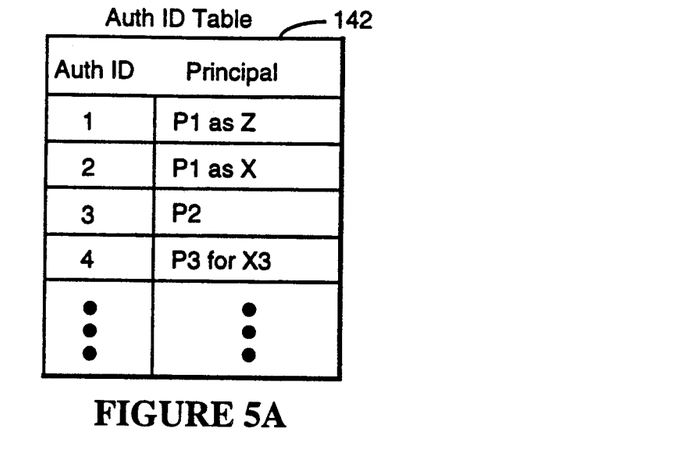
FIGS. 5A and 5B schematically depict an Authentication ID table and Channel Assignment Table maintained by authentication agents in the preferred embodiment of the present invention.

Each node's authentication agent 134 maintains an Auth ID table 142, shown in FIG. 5A, which lists the name of the principal and its assigned Auth ID. Each record in the table would typically also include other information, such as the name of the process that the principal is logged onto.

Figure 5B:
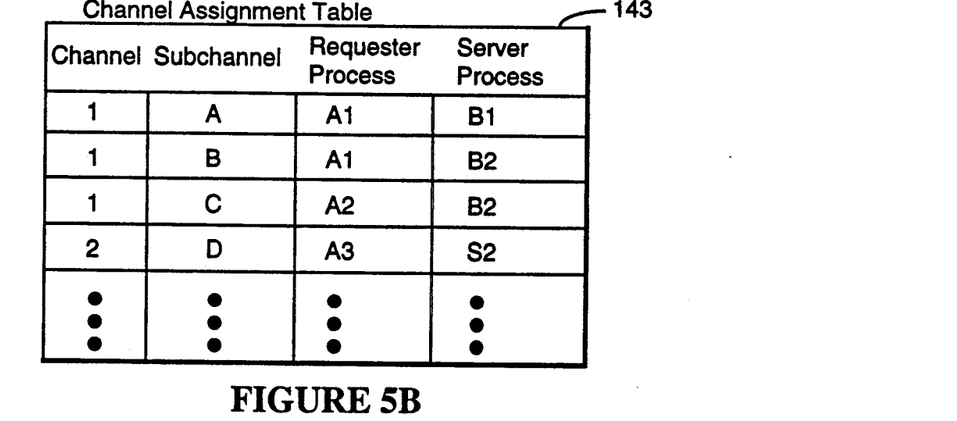

Each node's authentication agent 134 also maintains a Channel Assignment table 144, shown in FIG. 5B, which lists for each communication subchannel that has been assigned to a process, identifiers associated with the channel, subchannel, requester process and server process for which the subchannel is being used.

Figure 6:
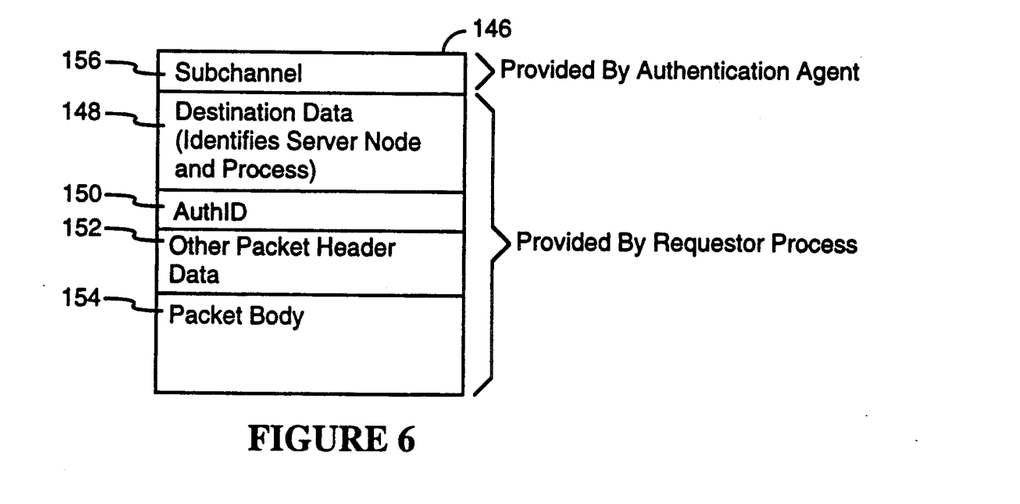
FIG. 6 schematically represents a data packet.

Referring to FIG. 6, each data packet 146 transmitted between nodes includes items provided by the process sending the data packet, and at least one field whose value is provided by the authentication agent. In particular, the requester process will typically generate a data packet 146 that includes destination data 148, a field 150 containing the alleged Auth ID of the principal on whose behalf the data packet is being sent, plus other packet header data 152 and the packet body 154. The destination data 148, whether included in the data packet or provided separately by the sending process, identifies the server node and process to which the data packet is being sent. For instance, the destination data 148 may comprise a node identifier and a process identifier.

The authentication agent adds a subchannel value 156 to the data packet 146 that corresponds to the requester and server processes. If no subchannel has previously been assigned to this pair of processes, a unique subchannel value is assigned and a new entry is added to the channel assignment table 144, and then the assigned subchannel value is added to the data packet. If a subchannel has previously been previously been assigned to this pair of processes, the assigned subchannel is obtained from the channel assignment table 144 and then added to the data packet 146. The subchannel value field 156 uniquely identifies the secure channel over which the packet will be sent, in addition to identifying the sending and receiving processes. Therefore, directly or indirectly, the subchannel field 156 includes a channel identifier. For instance, the subchannel field may contain a value used by the receiving node's network controller to determine which decryption key to use for decrypting the data packet.

Figure 7:
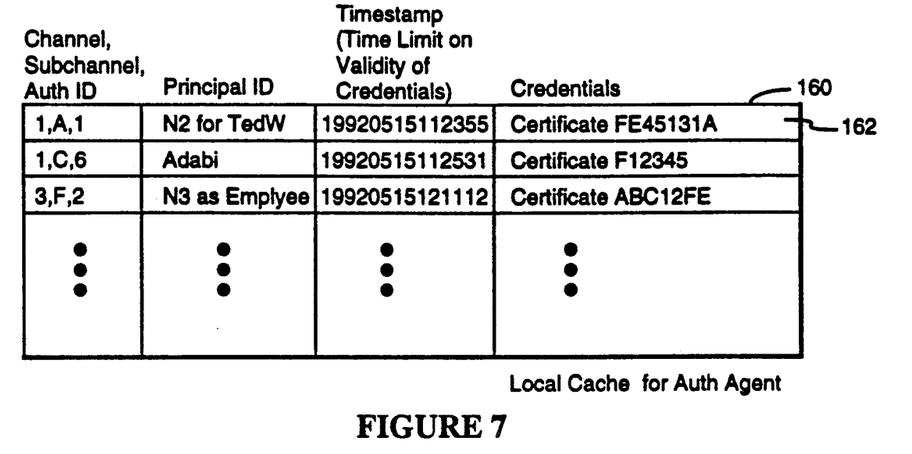
FIG. 7 schematically depicts a "local cache" of authentication data maintained by authentication agents in the preferred embodiment of the present invention.
Figure 8:
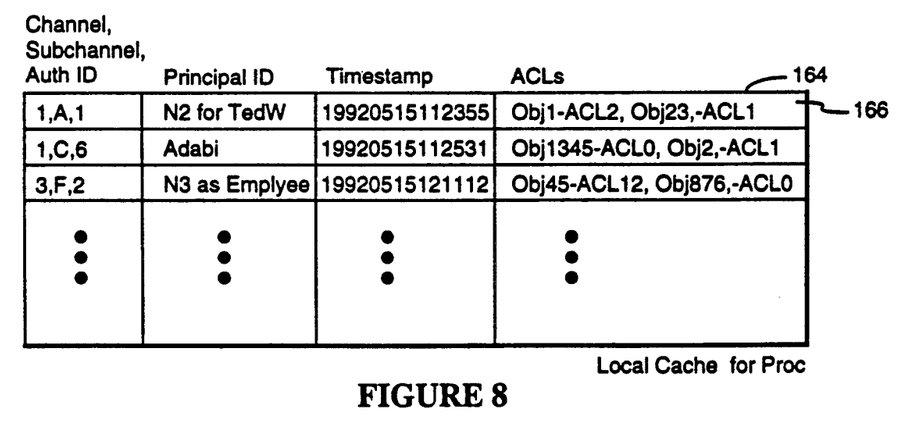
FIG. 8 schematically depicts a local cache of authentication data maintained on behalf of each server process in the preferred embodiment of the present invention.

Local Auth ID Cache for Authentication Agent. When a request message is sent from a requester principal to a server process, the authenticity of each request must be verified. The present invention modifies prior art authentication procedures by maintaining two types of "local caches" 160 and 164 (actually tables of data stored in memory) which identify requesters whose previous request messages were authenticated. The local cache 160 for the authentication agent lists the channel, subchannel and Auth ID of each principal from whom messages have been received. The record 162 in the local cache 160 for each such principal also includes a principal identifier, credentials received from the principal's host computer that authenticate the principal's messages, and a timestamp indicating a time limit on the validity of those credentials.

When a message from a principal is authenticated, a set of several credentials are sent to authenticate the message, include credentials authenticating the node, and credentials specific to the user. Each such credential has an associated time limit that limits the validity of that credential. When an authentication agent receives a set of credentials for a particular requester, it stores in the corresponding record 162 a timestamp representing the shortest duration time limit associated with the received credentials. That is, each received credential is delivered with a time limit (e.g., a datum indicating that the corresponding credential is valid for N seconds), and the authentication agent converts those time duration limits into a time value to be compared during later attempts to use the record 162 with the computer's current time value (maintained by the computer in conjunction with its clock circuit 126).

Local Auth ID Cache for Server Processes. In the preferred embodiment, each server process maintains a local cache 164 in its own address space. As shown in FIG. 8, each record 166 of the server process local cache identifies a requester principal from whom a request was previously received, the requester's Auth ID and the subchannel over which request messages from that requester have been received, a timestamp indicating a time limit on the validity of the local cache entry, as well a list of the object ACL entries which the requester principal is known to satisfy.

Figure 9:
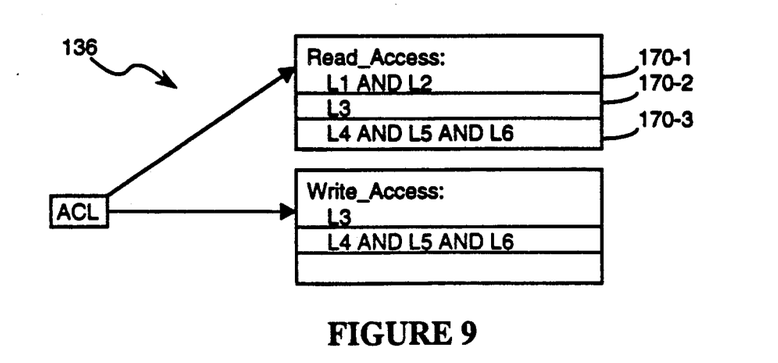
FIG. 9 is a block diagram representing an access control list.

As mentioned before, each object has an associated access control list (ACL). Typically, each ACL 136 contains a list of entries, each of which indicates the type of access allowed for a specified principal. As shown in FIG. 9, an object's ACL 136 consists of a set of entries 170 for each distinct type of access associated with the object. For instance, if an object is a set of data, it is possible or even likely that some principals might have only read access while other principals are allowed both read and write access. Each entry 170 defines one principal or compound principal who is authorized to access the object.

The concept of compound principals allows for virtually unlimited complexity in defining a requester or defining a party authorized to access an object. Compound principals, and their use in computer access control systems, are discussed extensively in pending patent applications Ser. No. 07/589,923, filed Sep. 28, 1990, entitled Compound Principals in Access Control Lists, and Ser. No. 07/783,361, filed Oct. 28, 1991, entitled Access Control Subsystem and Method for Distributed Computer System Using Compound Principals, both of which are hereby incorporated by reference.

Authenticating Requests. Referring to the flow chart in FIG. 10, whenever a request message is transmitted to a server process at another node, the receiving node identifies the requester in terms of the channel over which the data packet was transmitted, plus the subchannel and Auth ID fields 156 and 150 in the data packet. Note that the while subchannel field 156 in the preferred embodiment includes both channel and subchannel values, in other embodiments the channel might be identified in other ways, with the resulting channel value being passed to the server process along with the received data packet. In either case, it is the responsibility of the server process to ensure that the subchannel value in the received message corresponds to the actual secure channel over which the request was received.

Figure 10:
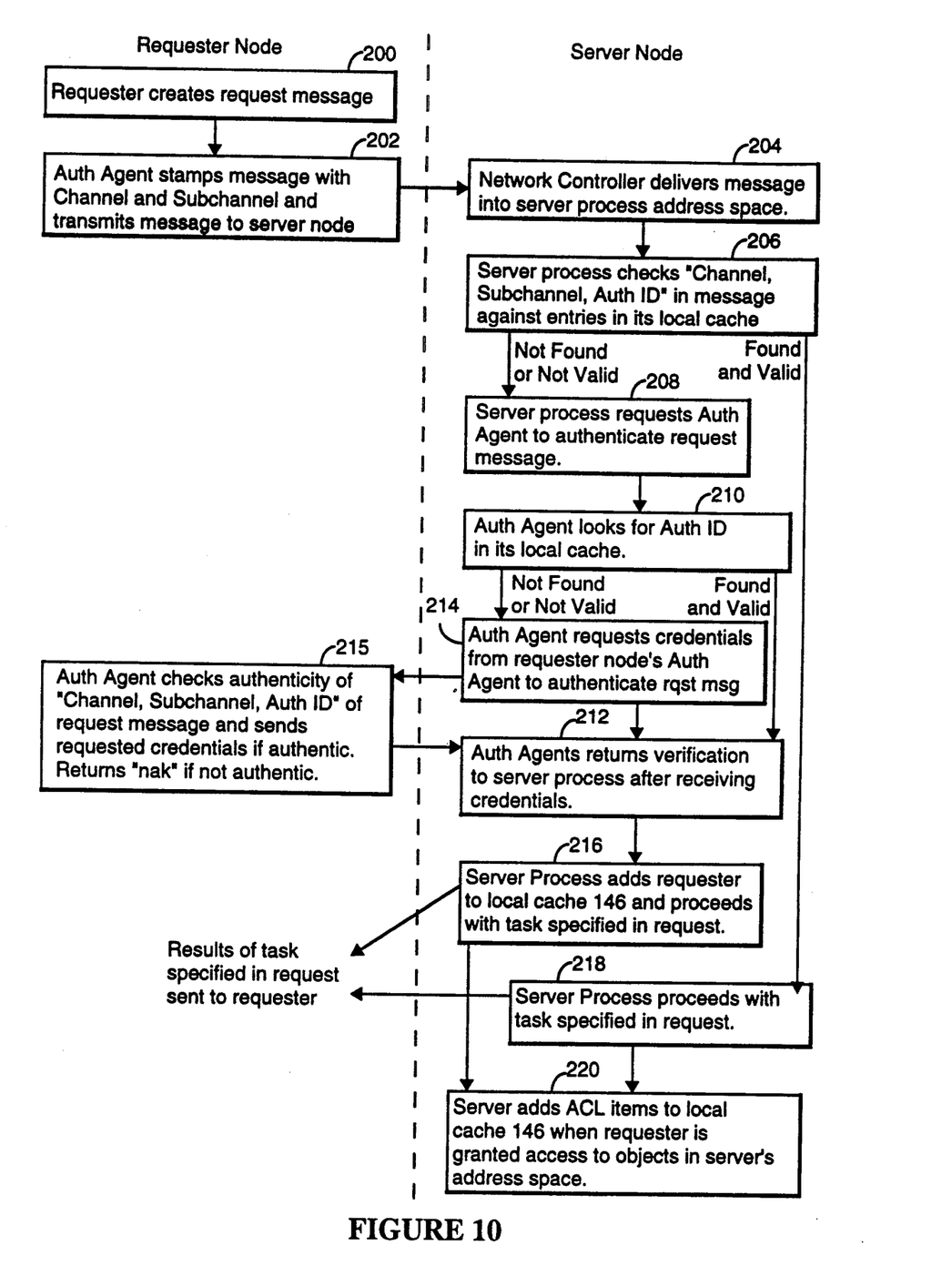
FIG. 10 is a flow chart of the authentication process performed by the authentication agents associated with a requester and a server.

In the preferred embodiment, the requester process creates the request message (step 200), including an alleged Auth ID value, and the authentication agent adds the channel and subchannel information to the corresponding data packet (step 202), based on the identities of the requester and server processes between which the data packet is being transmitted, before transmitting the request message data packet to the node associated with the requester server. Assuming that the packet arrives uncorrupted at its specified destination node, the data packet is delivered into the address space of the specified server process (step 204), for example process B1 of node 102-1. The server process B1 then checks its local cache 164 to see there is already an entry for the requester, as identified by the "channel, subchannel, Auth ID" values associated with the received data packet (step 206).

If the requester is not listed in the server's local cache 164, or if the entry 166 for the requester is no long valid (as determined by comparing the timestamp value in the entry 166 with a current time value (maintained by the computer in conjunction with its clock circuit 126), then the server process requests the authorization agent 134 for its node to authenticate the request message (step 208). Since the authentication agent 134 for the server's node may already have received credentials for the requester in a previous transaction, it looks for a record in its local cache matching the requester message's channel, subchannel and Auth ID (step 210). If the authentication agent's local cache 160 contains a record matching the channel, subchannel, and subchannel associated with the received message, and the timestamp value indicates that the record 162 for the requester is still valid, that means the request message is "pre-authenicated", in which case the authentication agent notifies the server process that the request message is authentic (step 212) and passes to the server process the timestamp and (optionally) the Principal ID for the requester. By including the Principal ID of the requester in the server process' local cache 164, accessing objects using the requester's Principal ID is made more efficient.

If the requester's Auth ID in not found in the authentication agent's local cache 160, then the authentication agent sends a request to the authentication agent of the requester's node for credentials to authenticate the request message (step 214). The authentication agent of the requester's node checks the authenticity of the "channel, subchannel, Auth ID" values associated with the request message. The first step of this checking process is searching its channel assignment table 144 for the request process associated with the request message's channel and subchannel. The second step is searching the Auth ID Table 142 to see if the specified Auth ID value is assigned to a principal logged onto the process found in the channel assignment table 144. If the authentication agent determines that the "channel, subchannel, Auth ID" values associated with the request message are valid, then it sends to the authentication agent in the server node the Principal ID for the requester, plus the required credentials, using digital signing protocols well known to those skilled in the art, thereby authenticating the request message (step 215). If the requester node authentication agent determines that the "channel, subchannel, Auth ID" values associated with the request message are not valid, it sends a negative acknowledgement (nak message) back to the server node's authentication agent, which will then void the request message.

Upon receipt of the required credentials, the server node's authentication agent stores the credentials in a record 162 in its local cache 160 and notifies the server process that the request message is authentic (step 212). The server process then adds a record 166 to its local cache 164 for the requester associated with the now-authenticated request message and proceeds with execution of the requested tasks (step 216).

Returning to step 206, if the requester is listed in the server's local cache 164, and the timestamp for the requester indicates that the previously received credentials for this requester are still valid, the server process proceeds with execution of the requested tasks (step 218). During execution of these tasks, if the server process successfully gains access to any objects on behalf of the requester, the ACL entries satisfied by the requester are added by the server process to the requester's record in the server process's local cache (step 220). The storage of ACL entries known to be satisfied by a particular requester in the server's local cache can be used by the server process to expedite granting access to previously accessed objects.

The authentication agent 143 for each node will periodically check its local cache 160 for records with expired credentials, so that such records can be deleted, along with the corresponding records in the server process local caches.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims. It should be noted that the authentication agent can be considered to be an abstraction representing various portions of an operating system, or even various secure programs, such as trusted applications, that run on top of the operating system, that performs the security functions of the above described invention.

What is claimed is:

1. In a distributed computer system having a multiplicity of interconnected computers, security apparatus comprising:
   a plurality of processes, each process running on one of said multiplicity of computers, said plurality of processes including requester processes and server processes;

secure channels connecting ones of said multiplicity of computers on which respective ones of said requester processes are running to second ones of said multiplicity of computers on which respective ones of said server processes are running; and a multiplicity of authenticating agents, each running in a trusted computing base on a different one of said multiplicity of interconnected computers;

one of said multiplicity of authenticating agents, running on one of said multiplicity of computers having at least one server process running thereon, including:

local cache means for maintaining data identifying previously authenticated requests from ones of said requester processes running on other ones of said multiplicity of interconnected computers; and received request authenticating means for authenticating, on behalf of said at least one server process, a received request when data in said received request match said data maintained by said local cache means, for obtaining credentials authenticating said received request when said first data in said received request does not match said data maintained by said local cache means, and for enabling said at least one server process to process said received request only after said received request has been authenticated.

2. The security apparatus of claim 1, wherein each requester process includes means for generating a request and for initiating transmission of said request over one of said secure channels to a specified one of said server processes; and each server process includes cache means for maintaining its own local cache of data identifying previously authenticated requests received by said server process; and local authenticating means for authenticating a received request when said first data in said received request matches said data maintained by its own cache means, and for requesting authentication of said received request by said authentication agent running on the same computer as said server process when said data in said received request does not match said data maintained by its own cache means.

3. The security apparatus of claim 1, wherein said local cache means includes means for time limiting validity of said data identifying previously authenticated requests;

said received request authenticating means including means for not matching data in said received request match with invalid data in said local cache means.

4. In a distributed computer system having a multiplicity of interconnected computers, security apparatus comprising:

a plurality of processes, each process running on one of said multiplicity of computers, said plurality of processes including requester processes and server processes;

secure channels connecting first ones of said multiplicity of computers on which respective ones of said requester processes are running to second ones of said multiplicity of computers on which respective ones of said server processes are running;

a plurality of authenticating agents, each running in a trusted computing base on a different one of said multiplicity of interconnected computers;

each requester process including means for generating a request and for initiating transmission of said request over one of said secure channels to a specified one of said server processes, said request including a first datum allegedly identifying a principal associated with said requester process;

each authenticating agent running on one of said multiplicity of interconnected computers having at least one requester process running thereon including:

request processing means for adding a second datum to each request generated by a requester process running on the same one of said multiplicity of computers as said authenticating agent, wherein said second datum uniquely corresponds to said originating requester process; and request authenticating means for authenticating that the first datum and second datum in a previously sent request are valid;

each authenticating agent running on one of said multiplicity of interconnected computers having at least one server process running thereon including:

local cache means for maintaining data indicating said first datum and second datum in previously authenticated requests; and received request authenticating means for (A) authenticating, on behalf of said at least one server process, a received request when said first datum and second datum in said received request match said data maintained by said local cache means, (B) obtaining authentication of said received request from said authenticating agent running on the same computer as the requester process that sent said received request when said first datum and second datum in said received request do not match said data maintained by said local cache means, and (C) enabling said at least one server process to process said received request only after said received request has been authenticated.

5. The security apparatus of claim 4, wherein each server process includes cache means for maintaining its own local cache of data indicating said first datum and second datum in previously authenticated requests received by said server process; and local authenticating means for authenticating a received request when said first datum and second datum in said received request match said data maintained by its own cache means, and for requesting authentication of said received request by said authentication agent running on the same computer as said server process when said first datum and second datum in said received request do not match said data maintained by its own cache means.

6. The security apparatus of claim 4, wherein said local cache means includes means for time limiting validity of said data identifying previously authenticated requests;

said received request authenticating means including means for not matching data in said received request match with invalid data in said local cache means.

7. A method of operating a distributed computer system having a multiplicity of interconnected computers, the steps of the method comprising:

running requester processes on at least a first subset of said multiplicity of computers and running server on at least a second subset of said multiplicity of computers;

interconnecting with secure channels first ones of said multiplicity of computers on which respective ones of said requester processes are running to second ones of said multiplicity of computers on which respective ones of said server processes are running;

establishing authenticating agents within a trusted computing base on each one of said multiplicity of computers;

said requester processes each generating requests and initiating transmission of said requests over ones of said secure channels to specified ones of said server processes, said requests each including a first datum allegedly identifying a principal associated with said each requester process;

said authenticating agents adding to each request generated by said requester processes a second datum uniquely corresponding to the one of said requester processes which generated said each request; and those of said authenticating agents established on ones of said multiplicity of computers having at least one server process running thereon (A) maintaining a local cache of data indicating said first datum and second datum in previously authenticated requests received by said at least one server process, and (B) authenticating, on behalf of said at least one server process, a received request when said first datum and second datum in said received request match said data in said local cache, (C) obtaining authentication of said received request, from said authenticating agent established on the computer running the requester process that sent said received request, when said first datum and second datum in said received request do not match said data maintained by said local cache means, and (D) for enabling said at least one server process to process said received request only after said received request has been authenticated.

8. The method of claim 7, each server process maintaining its own local cache of data indicating said first datum and second datum in previously authenticated requests received by said server process; and each server process self-authenticating a received request when said first datum and second datum in said received request match said data maintained by its own cache means, and requesting authentication of said received request by said authentication agent running on the same computer as said server process when said first datum and second datum in said received request do not match said data maintained by its own cache means.

9. The method of claim 7, said authentication agents time limiting validity of said data maintained in said local cache for each said previously authenticated request;

said authentication agents for not authenticating, on behalf of said at least one server process, a received request when said first datum and second datum in said received request match invalid data in said local cache.

* * * * *